(12) United States Patent
Lamesch et al.

(10) Patent No.: US 8,882,142 B2
(45) Date of Patent: Nov. 11, 2014

(54) CAPACITIVE OCCUPANT DETECTION SYSTEM

(75) Inventors: Laurent Lamesch, Reichlange (LU); Laurent Federspiel, Canach (LU)

(73) Assignee: IEE International Electronics & Engineering S.A., Luxembourg (LU)

( * ) Notice: Subject to any disclaimer, the term of this patent is extended or adjusted under 35 U.S.C. 154(b) by 0 days.

(21) Appl. No.: 14/000,677

(22) PCT Filed: Feb. 22, 2012

(86) PCT No.: PCT/EP2012/053015
§ 371 (c)(1),
(2), (4) Date: Sep. 3, 2013

(87) PCT Pub. No.: WO2012/113833
PCT Pub. Date: Aug. 30, 2012

(65) Prior Publication Data
US 2013/0334844 A1    Dec. 19, 2013

(30) Foreign Application Priority Data

Feb. 22, 2011 (LU) .......... 91792

(51) Int. Cl.
*B60R 21/16* (2006.01)
*B60N 2/56* (2006.01)
*B60N 2/00* (2006.01)
*B60R 21/015* (2006.01)

(52) U.S. Cl.
CPC .............. *B60N 2/002* (2013.01); *B60N 2/5678* (2013.01); *B60R 21/015* (2013.01)
USPC ....... 280/735; 180/271; 180/273; 297/180.12

(58) Field of Classification Search
CPC ................ B60R 21/15; B60R 21/0132; B60R 2021/01516; B60R 2021/01533; B60N 2/002; B60K 28/04; G01G 19/4142
USPC ............... 280/735; 180/271, 273; 297/180.12
See application file for complete search history.

(56) References Cited

U.S. PATENT DOCUMENTS

| 5,165,055 A * | 11/1992 | Metsler .......................... 333/12 |
| 7,119,705 B2 * | 10/2006 | Manlove et al. ............... 340/667 |
| 2001/0045733 A1 | 11/2001 | Stanley et al. |

(Continued)

FOREIGN PATENT DOCUMENTS

| DE | 10311132 A1 | 9/2004 |
| WO | 2007089655 A1 | 8/2007 |

OTHER PUBLICATIONS

International Search Report for corresponding application PCT/EP2012/053015 filed Feb. 22, 2012; Mail date May 4, 2012.

(Continued)

*Primary Examiner* — Paul N Dickson
*Assistant Examiner* — Darlene P Condra
(74) *Attorney, Agent, or Firm* — Cantor Colburn LLP

(57) ABSTRACT

A capacitive occupant detection system comprises at least one sensing electrode to be arranged on the bottom side of a seat cushion, a seat heater like structure to be arranged on a top side of said seat cushion, and an evaluation unit operatively coupled to said at least one sensing electrode for determining a value representative of the capacitance between the at least one sensing electrode and the seat heater like structure.

12 Claims, 4 Drawing Sheets

(56) References Cited

U.S. PATENT DOCUMENTS

| | | | |
|---|---|---|---|
| 2002/0038947 A1 | 4/2002 | Baba et al. | |
| 2003/0047983 A1* | 3/2003 | Wanami et al. | 297/464 |
| 2007/0029768 A1* | 2/2007 | Clos et al. | 280/735 |
| 2007/0192007 A1* | 8/2007 | Stanley et al. | 701/45 |
| 2008/0011732 A1* | 1/2008 | Ito et al. | 219/217 |
| 2008/0180234 A1* | 7/2008 | Yamanaka et al. | 340/438 |
| 2009/0295199 A1* | 12/2009 | Kincaid et al. | 297/180.12 |
| 2010/0327638 A1* | 12/2010 | Petereit et al. | 297/180.12 |
| 2011/0115500 A1* | 5/2011 | Stanley et al. | 324/661 |
| 2011/0121618 A1* | 5/2011 | Fischer et al. | 297/180.12 |

OTHER PUBLICATIONS

Joshua Smith, "Electric Field Sensing for Graphical Interfaces" IEEE Computer Graphics and Applications, Issue May/Jun. 1998, pp. 54-60.

Written Opinion for corresponding application PCT/EP2012/053015 filed Feb. 22, 2012; Mail date May 4, 2012.

* cited by examiner

CAPACITIVE OCCUPANT DETECTION SYSTEM

TECHNICAL FIELD

The present invention generally relates to the field of capacitive occupant detection systems e.g. to be used in the control of the deployment of secondary restraint systems of an automotive vehicle such as airbags, seat belt pretensioners and the like or in seat belt reminder systems.

BACKGROUND

Capacitive measurement and/or detection systems have a wide range of applications, and are among others widely used for the detection of the presence and/or the position of conductive body in the vicinity of an electrode of the system. A capacitive sensor, called by some electric field sensor or proximity sensor, designates a sensor, which generates a signal responsive to the influence of what is being sensed (a person, a part of a person's body, a pet, an object, etc.) upon an electric field. A capacitive sensor generally comprises at least one antenna electrode, to which is applied an oscillating electric signal and which thereupon emits an electric field into a region of space proximate to the antenna electrode, while the sensor is operating. The sensor comprises at least one sensing electrode—which could comprise the one or more antenna electrodes themselves—at which the influence of an object or living being on the electric field is detected.

The technical paper entitled "Electric Field Sensing for Graphical Interfaces" by J. R. Smith, published in Computer Graphics I/O Devices, Issue May/June 1998, pp 54-60 describes the concept of electric field sensing as used for making non-contact three-dimensional position measurements, and more particularly for sensing the position of a human hand for purposes of providing three dimensional positional inputs to a computer. Within the general concept of capacitive sensing, the author distinguishes between distinct mechanisms he refers to as "loading mode", "shunt mode", and "transmit mode" which correspond to various possible electric current pathways. In the "loading mode", an oscillating voltage signal is applied to a transmit electrode, which builds up an oscillating electric field to ground. The object to be sensed modifies the capacitance between the transmit electrode and ground. In the "shunt mode", which is alternatively referred to as "coupling mode", an oscillating voltage signal is applied to the transmit electrode, building up an electric field to a receive electrode, and the displacement current induced at the receive electrode is measured, whereby the displacement current may be modified by the body being sensed. In the "transmit mode", the transmit electrode is put in contact with the user's body, which then becomes a transmitter relative to a receiver, either by direct electrical connection or via capacitive coupling.

The capacitive coupling is generally determined by applying an alternative voltage signal to a capacitive antenna electrode and by measuring the current flowing from said antenna electrode either towards ground (in the loading mode) or into the second electrode (receiving electrode) in case of the coupling mode. This current is usually measured by means of a transimpedance amplifier, which is connected to the sensing electrode and which converts a current flowing into said sensing electrode into a voltage, which is proportional to the current flowing into the electrode.

While the above measurement principle generally leads to very useful results, it is clear that problems may arise in the vicinity of grounded structures (e.g. seat heaters in a vehicle seat). A seat heater comprises a heating element, which is typically a low-resistance conductor (in the form of a wire, cable, conductive trace printed on an insulating substrate, or the like) for being arranged under the seat cover.

The base capacitance measured between the sensing electrode of a capacitive occupant detection system and the reference electrode (car body) increases in close vicinity of a seat heater structure especially for systems without guard/shield electrode. This is due to the additional capacitive coupling between the sensing electrode and the seat heater structure, which by itself has a low impedance connection to the reference electrode (car body ground). Accordingly it is normally not possible to clearly separate the capacitance influence of the seat heater structure from the influence of the remaining car body since for example the seat heater structure is usually a separate unit.

In the current state of the art, the seat heater influence and the seat frame influence might be reduced by arranging the capacitive sensor electrodes above the seat heater in the seat any by the use of a guard/shield electrode between the sense electrode and the seat heater. These current implementations however increase the system cost by increasing the complexity of the integration into the seat.

BRIEF SUMMARY

The present invention proposes a different capacitive sensing system, which is not negatively affected by seat heater interference.

The capacitive occupant detection system according to the present invention comprises at least one sensing electrode to be arranged on the bottom side of a seat foam cushion. The sensing electrode being arranged at the bottom side of the seat cushion here means in the region between the cushion and seat frame or seat pan. The sensing electrode may be directly arranged on the bottom side of the foam cushion or placed directly on the seat frame, with the provision that the sensing electrode is electrically insulated from the seat fame. Alternatively there might be intermediate layers placed or arranged between the cushion and the electrode (fleece of the like) or the electrode and the seat frame. It will be noted that the sensing electrode may comprise a sheet like conductive material and/or a conductive wire applied on a carrier material and/or a conductive trace applied on a carrier material.

The capacitive occupant detection system further comprises a seat heater like structure to be arranged on a top side of said seat cushion and an evaluation unit operatively coupled to said at least one sensing electrode for determining a value representative of the capacitance between the at least one sensing electrode and the seat heater like structure. The seat heater like structure may be an actual seat heater structure such as a seat heater mat to be connected to a seat heater power supply. Alternatively, if the actual seat heater function is not desired by the customer, the seat heater like structure may comprise a seat heater dummy, i.e. an electrical conductor structure which may e.g. be similar to the one of an actual seat heater without being connected to a seat heater control unit for supplying a heating current to the electrical conductor.

The seat heater like structure is arranged on the top side of the seat foam cushion, i.e. on the so-called A-surface of the seat, between the cushion and seat trim. The seat heater like structure may be arranged directly on the seat foam or there may be intermediate layers e.g. of a non-woven material. Likewise there may be further layers arranged between the seat heater like structure and the seat trim.

The arrangement of the seat heater like structure and the sensing electrode is such that if a passenger is sitting in the vehicle seat, the seat foam is compressed under the influence of the weight of the passenger sitting in the seat and thus the seat heater like structure is brought closer to the sensing electrode on the bottom of the seat foam. The capacitance between seat heater or seat heater dummy and the sensing electrode is thereby increased and this increase in capacitance is detected by the evaluation unit which is operatively coupled to the at least one sensing electrode. The presence of a passenger in the seat may e.g. be determined if the value representative of the capacitance between the at least one sensing electrode and the seat heater like structure passes a specific predetermined threshold value.

Instead of directly determining the influence of an electrically conductive body on an electrical field, the capacitive sensing system of the present system indirectly determines the presence of a passenger by determining an amount of compression of the seat foam. The capacitive sensing system takes advantage of the presence of a seat heater present in the seat respectively relies on a seat heater dummy arranged in the seat.

In a possible embodiment of the invention, said evaluation unit comprises an AC signal source coupled to said seat heater like structure for impinging an AC voltage signal on said seat heater like structure and a transimpedance amplifier coupled to said sensing electrode for converting an AC current flowing into the sensing electrode into an AC output voltage.

If the seat heater like structure is a dummy seat heater, there is no specific technical problem to solve in order to supply the seat heater like structure with the appropriate AC signal.

If however the seat heater like structure is an actual seat heater mat, which is to be supplied with DC power by a DC power source, one must make sure to decouple the DC power supply from the AC signal source. In one possible embodiment, the DC power source therefore supplies a DC power to the seat heater mat via a common mode choke. Alternatively the DC power source supplies a DC power to the seat heater mat via power amplifiers and said AC voltage signal of said AC signal source is coupled to an input of said power amplifiers.

In a further embodiment, the capacitive occupant detection system comprises a guard electrode to be arranged between said sensing electrode and a lower seat frame. In this case, the evaluation unit may comprise an AC signal source coupled to said guard electrode for impinging an AC voltage signal on said guard electrode and a transimpedance amplifier, a reference input of which is connected to said AC voltage signal of said AC signal source and a signal input of which is connected to said sensing electrode for converting an AC current flowing into the sensing electrode into an AC output voltage.

The seat heater like structure is in this case preferably coupled to AC ground by means of a grounding capacitor.

It will be appreciated that the present invention also relates to a vehicle seat with a capacitive occupant detection system as described hereinabove. The vehicle seat comprises a lower seat frame, a seat foam cushion arranged on said lower seat frame and a seat trim arranged on top of said seat foam cushion. The seat heater like structure is preferably arranged between said seat foam cushion and said seat trim and said at least one sensing electrode is preferably arranged between said seat foam cushion and said lower sear frame so as to be being electrically insulated from said seat frame.

Finally, if the capacitive occupant detection system comprises a guard electrode, said at least one sensing electrode and said guard electrode are preferably arranged between said seat foam cushion and said lower sear frame, said guard electrode being arranged between said sensing electrode and a lower seat frame. Advantageously the arrangement will be such that said guard electrode is electrically insulated from said seat frame and that said sensing electrode is electrically insulated from said seat frame and said guard electrode.

BRIEF DESCRIPTION OF THE DRAWINGS

Preferred embodiments of the invention will now be described, by way of example, with reference to the accompanying drawings in which.

DETAILED DESCRIPTION

Figure 1:
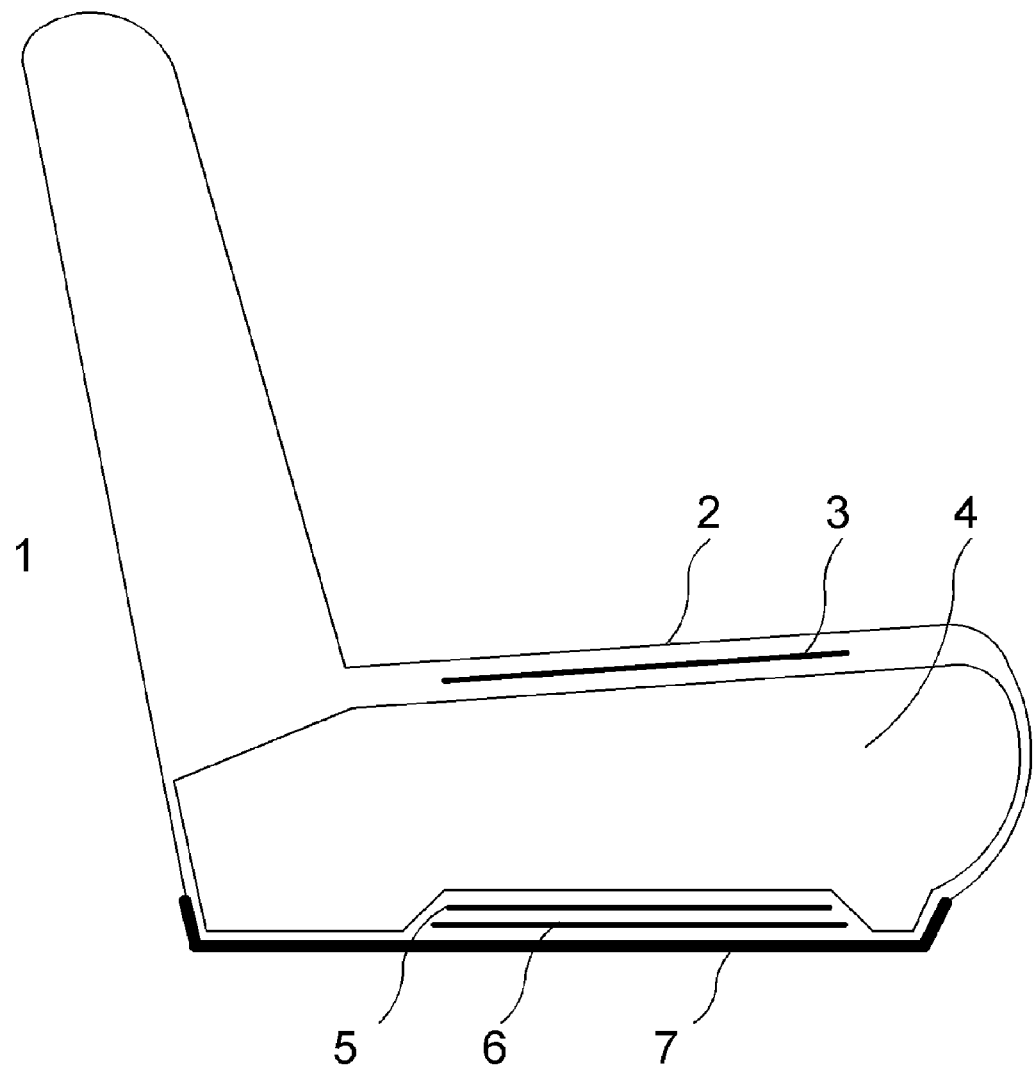
FIG. 1 shows a possible electrode arrangement of a capacitive sensing system in a vehicle seat.

FIG. 1 shows the mechanical implementation of the measurement system in a passenger seat 1 of a car. The seat heater or seat heater dummy 3 is mounted below the seat trim 2 and on top of the seat foam 4. A dummy seat heater or equivalent electrode is required to be installed when seat-heating function is not desired by the customer. Such a seat heater dummy may comprise an electrical conductor structure similar to the one of an actual seat heater without being connected to a seat heater control unit for supplying a heating current to the electrical conductor.

A sensing electrode 5 is mounted below the seat foam 4 and on top of a guard electrode 6. Guard electrode 6 is mounted on top of the seat frame or seat pan 7. Electrodes 5 and 6 are electrically isolated from the seat frame 7. Guard electrode 6 shields the sensing electrode 5 from the seat frame 7, which is typically connected to ground or AC ground. Guard electrode 6 is not required for all possible implementation options, as described below.

When a passenger sits down on the seat, the weight of the passenger compresses the seat foam 4 in the vertical direction, thereby approaching the seat heater or seat heater dummy 3 towards the sensing electrode 6. The capacitance between seat heater or seat heater dummy 3 and sensing electrode 5 is thereby increased. This increase in capacitance is measured with an electronic circuit not shown in FIG. 1 but detailed below.

Figure 2:
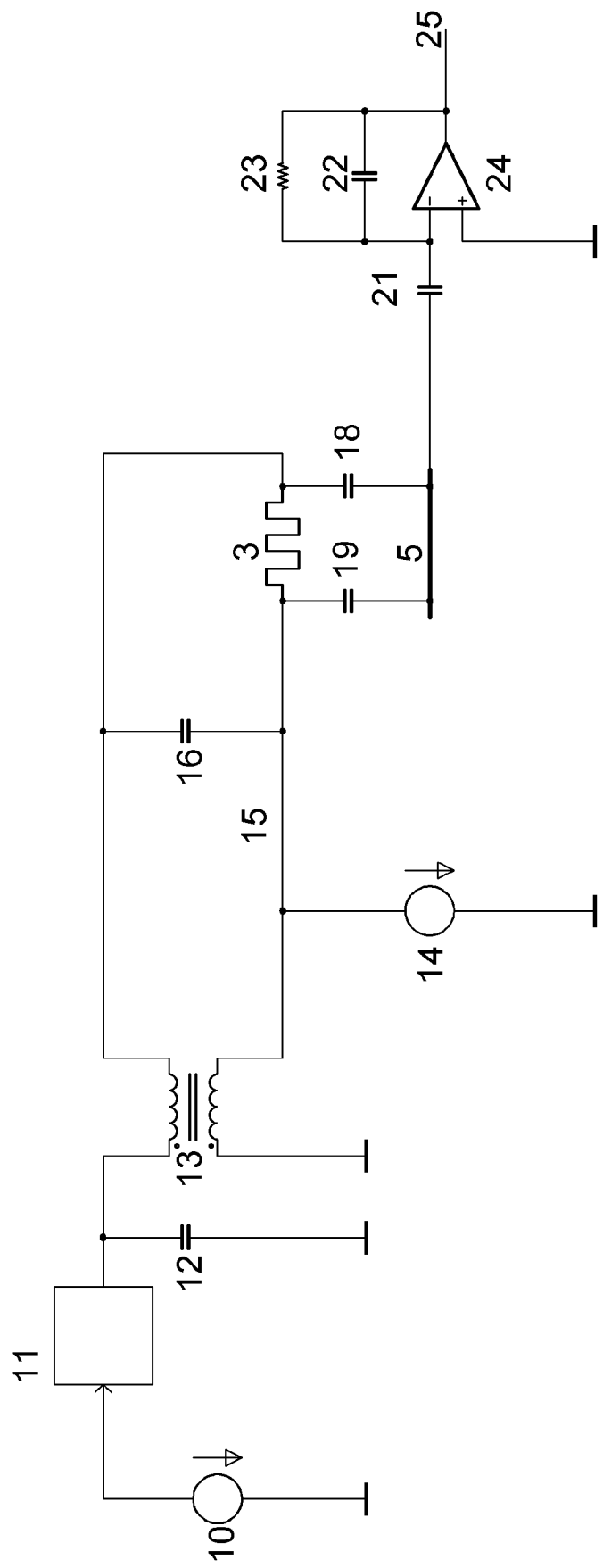
FIG. 2 shows a first embodiment of a capacitance measurement circuit of an evaluation unit of a capacitive sensing system operating in the so-called coupling mode.

FIG. 2 shows a first implementation of a capacitive measurement circuit for an evaluation unit, which can be used in conjunction with the setup shown in FIG. 1. The circuit is measuring the unknown capacitance in the so-called coupling mode, that is, the capacitance between two electrodes. In this case, the first electrode is the seat heater 3 and the second electrode is the sensing electrode 5.

A DC power source 10 supplies the electrical power to the seat heater 3 through switch 11 and common mode choke 13. Switch 11 can alternatively also be placed between common mode choke 13 and ground.

An AC voltage source 14 impinges an AC voltage on the seat heater 3. The common mode impedance of the common mode choke 13 is chosen to be substantially larger than the output impedance of AC voltage generator 14 in order to avoid loading the AC voltage source excessively.

The capacitances 18 and 19 represent the capacitances respectively impedances to be determined. They are located between seat heater 3 and sensing electrode 5. A transimpedance amplifier comprising a coupling capacitor 21, feedback impedance including a capacitor 22 and a resistor 23, and an operational amplifier 24 converts the AC current flowing from the seat heater 3 through the capacitances respectively impedances to be measured 18 and 19 into the sensing electrode 5 into an AC output voltage on output node 25.

The AC output voltage on output node 25 is thereby responsive to the unknown capacitances respectively impedances 18 and 19. Obviously, the measurement circuit is also able to measure an unknown complex impedance instead of the unknown capacitances 18 and 19, as the phase between the output voltage on output node 25 and the voltage of AC voltage source 14, respectively the in-phase and quadrature parts of the output voltage on output node 25 compared to the voltage of AC voltage source 14 are responsive to the real and reactive parts of an unknown complex impedance used instead of unknown capacitances 18 and 19.

On order to avoid erroneous classification of the seat occupancy status in case of a rupture of the seat heater conductor, a capacitor 16 is connected in parallel the seat heater 3 electrical conductor. Capacitor 16 has an impedance which is substantially smaller than the impedance of the total capacitance or impedance to be measured 18 and 19.

Without capacitor 16, if the seat heater 3 should break, then the capacitive measurement would only measure one part of the capacitance or impedance to be measured 18 and 19, for example in FIG. 2, if heater 3 breaks in the middle, only capacitance or impedance to be measured 19 would be measured by the measurement circuit. Additionally, a break in the seat heater 3 can be detected by measuring the current heating current when the heater 3 is switched on and a warning message can then be issued to the car user.

Capacitor 12, typically having a small capacitance, avoids that any AC current coming from the AC signal source 14 is fed back into the power source 10 and thereby into the car power network. As can also be seen, the capacitive measurement circuit is able to operate independent whether the seat heater is heating, that is supplied with DC power or not. The guard electrode 6 in FIG. 1 is not required for the so-called coupling mode as a capacitance between sensing electrode 5 and ground is shunted by the input impedance of said transimpedance amplifier.

Figure 3:
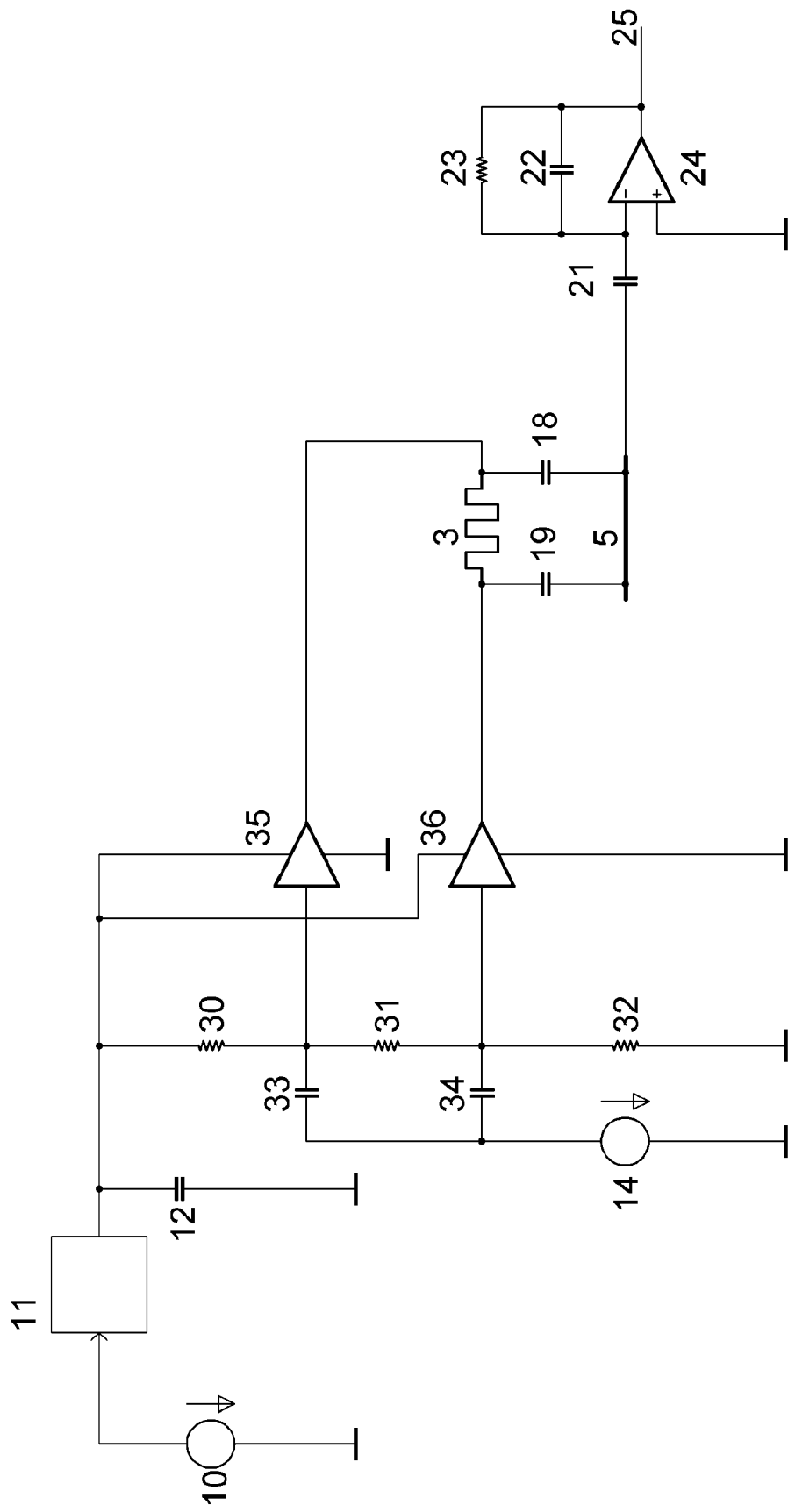
FIG. 3 shows a second embodiment of a capacitance measurement circuit operating in the so-called coupling mode.

FIG. 3 shows a second implementation of a capacitive measurement circuit, which can be used in conjunction with the setup shown in FIG. 1. The circuit is also measuring the unknown capacitance in the so-called coupling mode, that is, the capacitance between two electrodes. In this case, the first electrode is the seat heater 3 and the second electrode is the sensing electrode 5.

The circuit shown in FIG. 3 is almost identically to the circuit shown in FIG. 2, except that the AC voltage source 14 now drives two power amplifiers 35 and 36 in order to impinge an AC voltage on the DC heating supply voltage. Power amplifiers 35 and 36 are supplied with DC power from the DC source 10 through switch 11. Power amplifiers 35 and 36 have preferably a voltage gain of one.

A resistive voltage divider comprising resistors 30, 31 and 32 sets the DC bias points of power amplifiers 35 and 36, for example for a DC supply voltage of 12 V, amplifier 35 DC output voltage is set to 11.5 V, and amplifier 36 DC output voltage is set to 0.5 V. AC voltage source 14 supplies an AC voltage with an amplitude of for example 0.2 V for the bias voltages described above. This AC voltage is AC coupled through coupling capacitors 33 and 34 onto the inputs of amplifiers 35 and 36, and thereby on the outputs of amplifiers 35 and 36.

Output voltage of amplifier 35 is therefore a DC voltage of 11.5 V superimposed with an AC voltage with an amplitude of 0.2 V, and output voltage of amplifier 36 is therefore a DC voltage of 0.5 V superimposed with an AC voltage with an amplitude of 0.2 V. The AC voltage impinged on the seat heater is therefore the same AC voltage than the AC voltage of AC voltage source 14.

Power amplifiers 35 and 36 can for example be Mosfet transistors operated in conjunction with a feedback loop using an operational amplifier as error amplifier. The rest of the operation of the circuit is similar to the operation of the circuit in FIG. 2. Capacitor 16 in FIG. 2 is not required as both amplifiers 35 and 36 output the same AC voltage.

As can also be seen, the capacitive measurement circuit is able to operate independent whether the seat heater is heating, that is supplied with DC power or not. The circuit in FIG. 3 is also able to measure complex unknown impedances 18 and 19.

Figure 4:
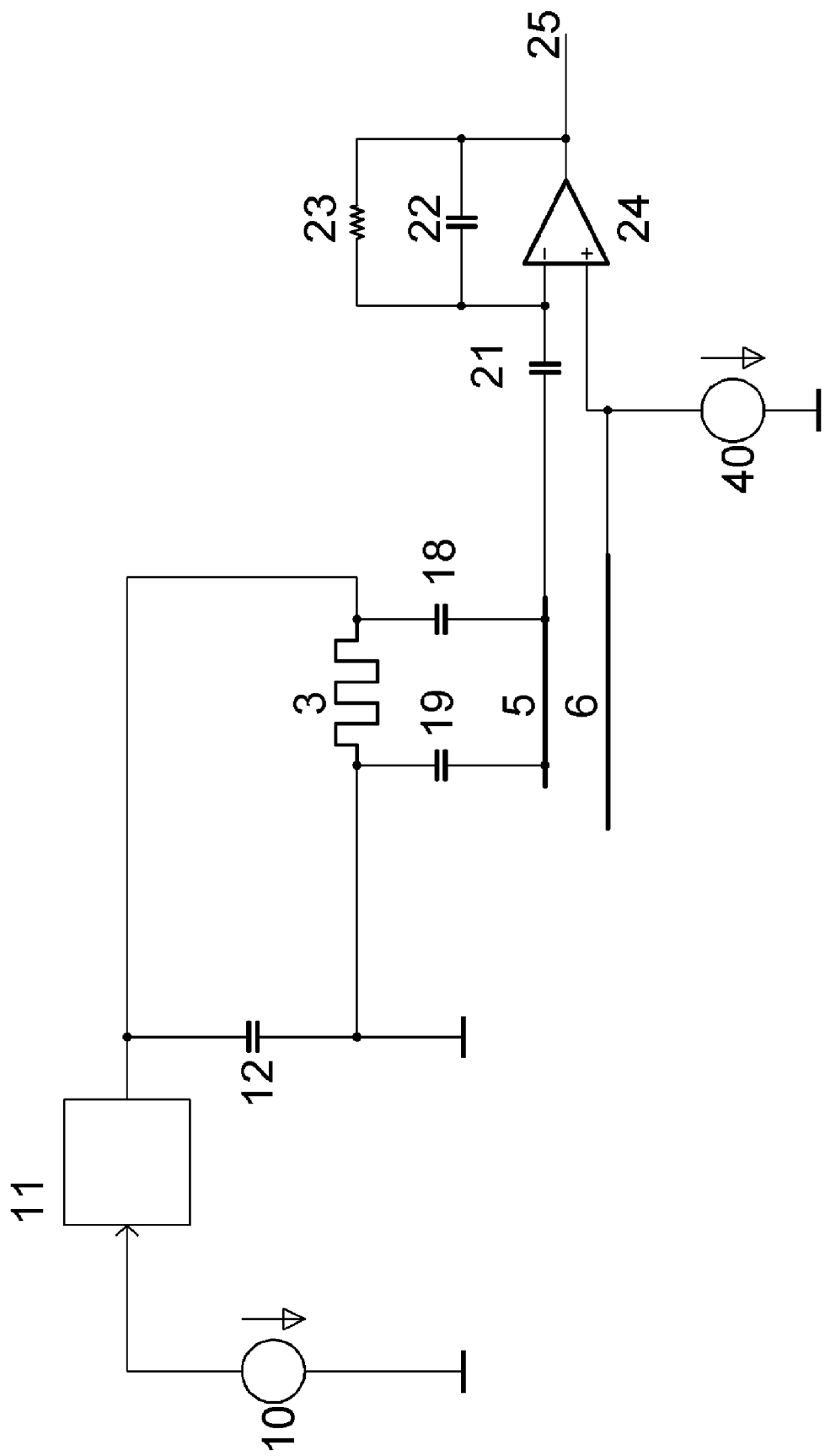
FIG. 4 shows a third embodiment of a capacitance measurement circuit operating in the so-called loading mode.

FIG. 4 shows a third implementation of a capacitive measurement circuit, which can be used in conjunction with the setup shown in FIG. 1. The circuit is measuring the unknown capacitance in the so-called loading mode, that is, the capacitance between a sensing electrode 5 and AC ground. AC ground is supplied by the seat heater in this case.

A DC power source 10 supplies the electrical power to the seat heater 3 through switch 11. Switch 11 can alternatively also be placed between seat heater 3 and ground. Capacitor 12 ensures that the seat heater 3 is always fully connected to AC ground, even when switch 11 is in the off state or if the seat heater has a single wire break.

AC voltage source 40 generates an AC voltage, which is fed into the reference input of the transimpedance amplifier, which is formed by the coupling capacitor 21, the feedback impedance made of capacitor 22 and resistor 23, and the operational amplifier 24. The signal input of the transimpedance amplifier is connected to sense electrode 5.

As the AC voltage of the signal input of the transimpedance amplifier tracks the AC voltage of the reference input, which is the AC voltage of signal source 40, the sense electrode 5, and the guard electrode 6 connected to the signal source 40, are maintained at the same AC voltage. Thereby, the guard electrode shields the sense electrode from unwanted coupling to the AC ground, typically the seat frame 7 in FIG. 1.

The AC current flowing out of the sense electrode 5 through the unknown capacitances or impedances 18 and 19, through the seat heater into the AC ground is measured by said transimpedance amplifier and converted by said transimpedance amplifier into an AC voltage on its output 25. The AC output voltage on output node 25 is thereby responsive to the unknown capacitances respectively impedances 18 and 19.

Obviously, the measurement circuit is also able to measure an unknown complex impedance instead of the unknown capacitances 18 and 19, as the phase between the output voltage on output node 25 and the voltage of AC voltage source 40, respectively the in-phase and quadrature parts of the output voltage on output node 25 compared to the voltage of AC voltage source 40 are responsive to the real and reactive parts of an unknown complex impedance used instead of unknown capacitances 18 and 19. As can be seen, the capacitive measurement circuit is able to operate independent whether the seat heater is heating, that is supplied with DC power or not.

For all the cases described above, measuring the real part of the unknown impedances 18 and 19 may be used to detect if the seat foam or seat trim has become wet. Said wetness typically increases the measured capacitive part. Using the real part of the measurement allows the adaptation of the detection threshold against which the measured capacitance is compared in order to detect the presence of a passenger, in case of a wet seat.

The invention claimed is:

1. A capacitive occupant detection system comprising at least one sensing electrode to be arranged on a bottom side of a seat cushion, a seat heater like structure to be arranged on a top side of said seat cushion, and an evaluation unit operatively coupled to said at least one sensing electrode for determining a value representative of the capacitance between the at least one sensing electrode and the seat heater like structure, wherein said evaluation unit comprises an AC signal source coupled to said seat heater like structure for impinging an AC voltage signal on said seat heater like structure and a transimpedance amplifier coupled to said sensing electrode for converting an AC current flowing into the sensing electrode into an AC output voltage, and wherein said seat heater like structure is a seat heater mat, wherein said seat heater mat is operatively coupled to a DC power source in such a way that, in operation, said DC power source supplies a DC power to the seat heater mat via power amplifiers and wherein said AC voltage signal of said AC signal source is coupled to an input of said power amplifiers.

2. The capacitive occupant detection system according to claim 1, wherein said sensing electrode comprises a sheet like conductive material.

3. The capacitive occupant detection system according to claim 1, wherein said sensing electrode comprises a conductive wire applied on a carrier material.

4. The capacitive occupant detection system according to claim 1, wherein said sensing electrode comprises a conductive trace applied on a carrier material.

5. A capacitive occupant detection system comprising at least one sensing electrode to be arranged on a bottom side of a seat cushion, a seat heater like structure to be arranged on a top side of said seat cushion, and an evaluation unit operatively coupled to said at least one sensing electrode for determining a value representative of the capacitance between the at least one sensing electrode and the seat heater like structure, wherein the capacitive occupant detection system further comprises a guard electrode to be arranged between said sensing electrode and a lower seat frame, wherein said evaluation unit comprises an AC signal source coupled to said guard electrode for impinging an AC voltage signal on said guard electrode and a transimpedance amplifier, a reference input of which is connected to said AC voltage signal of said AC signal source and a signal input of which is connected to said sensing electrode for converting an AC current flowing into the sensing electrode into an AC output voltage.

6. The capacitive occupant detection system according to claim 5, wherein said seat heater like structure is coupled to AC ground by means of a grounding capacitor.

7. The capacitive occupant detection system according to claim 5, wherein said sensing electrode comprises a sheet like conductive material.

8. The capacitive occupant detection system according to claim 5, wherein said sensing electrode comprises a conductive wire applied on a carrier material.

9. The capacitive occupant detection system according to claim 5, wherein said sensing electrode comprises a conductive trace applied on a carrier material.

10. A vehicle seat with a capacitive occupant detection system, said vehicle seat comprising a lower seat frame, a seat foam cushion arranged on said lower seat frame and a seat trim arranged on top of said seat foam cushion, said capacitive occupant detection system comprising at least one sensing electrode, a seat heater like structure and an evaluation unit operatively coupled to said at least one sensing electrode for determining a value representative of the capacitance between the at least one sensing electrode and the seat heater like structure, wherein said seat heater like structure is arranged between said seat foam cushion and said seat trim and wherein said at least one sensing electrode is arranged between said seat foam cushion and said lower seat frame so as to be being electrically insulated from said seat frame, wherein said evaluation unit comprises an AC signal source coupled to said seat heater like structure for impinging an AC voltage signal on said seat heater like structure and a transimpedance amplifier coupled to said sensing electrode for converting an AC current flowing into the sensing electrode into an AC output voltage, and wherein said seat heater like structure is a seat heater mat, wherein said seat heater mat is operatively coupled to a DC power source in such a way that, in operation, said DC power source supplies a DC power to the seat heater mat via power amplifiers and wherein said AC voltage signal of said AC signal source is coupled to an input of said power amplifiers.

11. A vehicle seat with a capacitive occupant detection system, said vehicle seat comprising a lower seat frame, a seat foam cushion arranged on said lower seat frame and a seat trim arranged on top of said seat foam cushion, said capacitive occupant detection system comprising at least one sensing electrode, a seat heater like structure, a guard electrode and an evaluation unit operatively coupled to said at least one sensing electrode for determining a value representative of the capacitance between the at least one sensing electrode and the seat heater like structure, said evaluation unit comprising an AC signal source coupled to said guard electrode for impinging an AC voltage signal on said guard electrode and a transimpedance amplifier, a reference input of which is connected to said AC voltage signal of said AC signal source and a signal input of which is connected to said sensing electrode for converting an AC current flowing into the sensing electrode into an AC output voltage, wherein said seat heater like structure is arranged between said seat foam cushion and said seat trim and wherein said at least one sensing electrode and said guard electrode are arranged between said seat foam cushion and said lower sear frame, said guard electrode being arranged between said sensing electrode and a lower seat frame, the arrangement being such that said guard electrode is electrically insulated from said seat frame and that said sensing electrode is electrically insulated from said guard electrode.

12. The vehicle seat according to claim 11, wherein said seat heater like structure is coupled to AC ground by means of a grounding capacitor.

* * * * *